Figure 1:
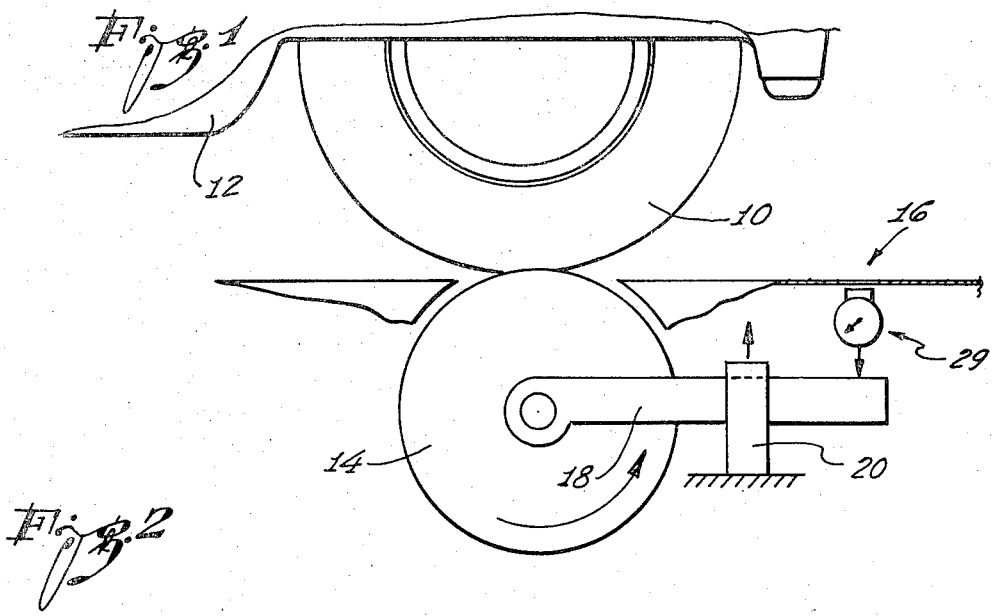

United States Patent [19]
Pelta

[11] 3,765,232
[45] Oct. 16, 1973

[54] DYNAMOMETER SYSTEM

[75] Inventor: Edmond R. Pelta, Pacific Palisades, Calif.

[73] Assignee: Autoscan, Inc., Los Angeles, Calif.

[22] Filed: Aug. 5, 1971

[21] Appl. No.: 169,308

[52] U.S. Cl. ................................................. 73/117
[51] Int. Cl. .............................................. G01l 5/13
[58] Field of Search...................... 73/117, 134, 135, 73/136 B

[56] References Cited
UNITED STATES PATENTS
2,746,289   5/1956   Cline.................................... 73/117
2,563,425   8/1951   Schaevitz ......................... 73/136 B Primary Examiner—Jerry W. Myracle
Attorney—Smyth, Roston & Pavitt

[57] ABSTRACT

A system is provided for measuring the horsepower applied to the wheels of an automobile when the automobile is disposed on the rolls of a dynamometer. The system includes a bridge circuit formed by a plurality of strain gages. The strain gages are responsive to a torque imparted to the wheels of the automobile to produce an unbalance in the bridge in accordance with such torque.

The system also includes means for producing a voltage related to the speed of rotation of the automobile wheels. This voltage is introduced to a first pair of opposite terminals in the bridge. A voltage representing the horsepower is then obtained from a second pair of output terminals in the bridge.

One of the terminals in the second pair may be connected to a reference potential to eliminate the effects of any voltage common to the terminals in the first pair. Means may also be included in the bridge arrangement for controlling the speed of the vehicle and for compensating in the bridge for any unbalance produced by such control means.

9 Claims, 2 Drawing Figures

PATENTED OCT 16 1973

3,765,232

INVENTOR:
Edmond R. Pelta

By Smyth, Roston & Pavitt
ATTORNEYS

DYNAMOMETER SYSTEM

This invention relates to a system for measuring hosepower in a dynamometer and particularly relates to a system which provides such a measurement by a simple combination of electrical means and without any moving parts.

Measurements have been provided for a considerable number of years of the horsepower imparted to the wheels of an automobile which is disposed on the rolls of a dynamometer. In one type of apparatus, a first analog measurement is made of the speed of rotation of the wheels in the automobile and a second analog measurement is made of the torque imparted to the wheels of the automobile or the rolls of the dynamometer. The horsepower is then determined by multiplying the first and second voltages on an analog basis. Such apparatus is not desirable because the analog multipliers are subject to drift so that the apparatus does not provide a reliable indication of horsepower.

In another type of apparatus for measuring horsepower, a tachometer produces a voltage proportional to the speed of rotation of the automobile wheels. This voltage is applied across a potentiometer having a movable arm. The arm is moved along the potentiometer in accordance with variations in the torque applied to the automobile wheels. The resultant voltage on the movable arm indicates horsepower since it constitutes in effect a multiplication of torque times speed. This type of apparatus is complicated and unreliable, particularly since the inclusion of a movable arm causes errors to be produced in the positioning of the arm and since the electrical contact between the potentiometer and the arm eventually becomes worn.

This invention provides a system which indicates horsepower imparted to automobile wheels or dynamometer rolls on a simple and reliable basis. The system is particularly reliable in view of its simplicity and in view of the fact it includes no moving parts. The system is also advantageous in that it has a high speed of response and is able to indicate horsepower reliably and accurately regardless of the speed of rotation of the automobile wheels.

The system includes a bridge circuit formed from a plurality of resistance elements such as strain gages. The strain gages are responsive to the torque imparted to the wheels of the automobile to produce an unbalance in the bridge in accordance with such torque. The system further includes means for producing a voltage related to the speed of rotation of the automobile wheels. This voltage is introduced to a first pair of opposite terminals in the bridge. A voltage representing the horsepower is then obtained from a second pair of opposite terminals in the bridge.

One of the terminals in the second pair may be connected to a reference potential such as ground to eliminate the effects of any voltage common to the terminals in the first pair. By eliminating the effects of any such voltage, the voltage produced across the second pair of terminals in the bridge provides an accurate and sensitive indication of horsepower. Means may also be included in the bridge arrangement for controlling the speed of the vehicle and for compensating in the bridge for any unbalance produced by such control means.

Figure 2:
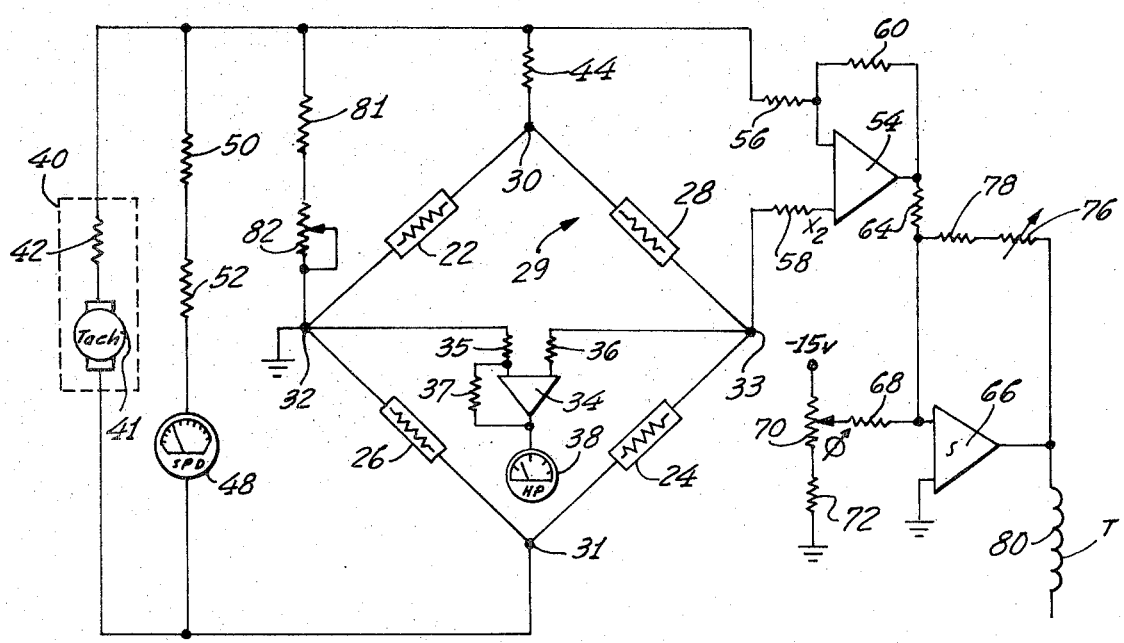

In the drawings:

FIG. 1 is a schematic diagram of a dynamometer system for imparting torque to the wheels of an automobile and for producing stresses or strains in a plurality of strain gages in accordance with such torque; and FIG. 2 is a circuit diagram of an electrical system constituting one embodiment of the invention for indicating the horsepower imparted to the wheels of the automobile.

In one embodiment of the invention, wheels 10 of an automobile 12 are adapted to be disposed on rolls 14 of a dynamometer generally indicated at 16. An arm 18 is adapted to be mounted on the axle of at least one of the rolls 14, and a brake 20 is applied to at least one of the rolls 14 to control the torque applied to the roll. Strain gages 22, 24, 26 and 28 in a bridge generally indicated at 29 are mounted on the arm 18 at a particular distance from the axis of the rolls. The strain gages 22, 24, 26 and 28 are of conventional construction and are preferably matched in impedance characteristics over the full range of stresses or strains and temperature to a value less than 1 percent. The strain gages 22 and 24 are disposed on one side of the arm 18 to become compressed by the torque applied to the arm as a result of the brake force, and the strain gages 26 and 28 are disposed on the other side of the arm to become tensioned by the torque applied to the arm.

Although four strain gages are shown as being disposed on the arm 18, it will be appreciated that a number of strain gages less than four may be provided on the arm. For example, only the strain gage 22 may be disposed on the arm and three other resistive members not subject to strain may be used in place of the strain gages 24, 26 and 28.

The strain gages 22, 24, 26 and 28 are connected in the bridge circuit 29 shown in FIG. 2. The strain gages 22 and 24 are disposed in diagonally opposite arms of the bridge and the strain gages 26 and 28 are also disposed in diagonally opposite arms of the bridge. In this way the strain gages 22 and 28 and the strain gages 24 and 26 are respectively paired to define a first pair of opposite terminals 30 and 31. Similarly, the strain gages 22 and 26 and the strain gages 24 and 28 are respectively paired to define a second pair of opposite terminals 32 and 33.

Means are connected between the pair of opposite terminals 32 and 33 in the bridge to indicate the horsepower provided to the dynamometer. Such means include an operational amplifier 34 having a pair of input terminals and an output terminal. Resistances 35 and 36 are respectively connected between the input terminals of the amplifier 34 and the opposite terminals 32 and 33 of the bridge. A resistance 37 is connected between the output terminal of the amplifier and one of the input terminals of the amplifer. A meter 38 is also connected to the output terminal of the amplifier to indicate horsepower.

Means such as a tachometer 40 are adapted to be connected to the rolls of the dynamometer or to the wheels of the automobile to measure the speed of the dynamometer and to produce a voltage having a magnitude dependent upon such speed. The tachometer 40 is indicated in broken lines as including a rotary member 41 and as having an internal resistance 42. The tachometer 40 is connected in series with a resistance 44 between the opposite pair of terminals 30 and 31 in the bridge. An electrical arm formed by a meter 48 and resistances 50 and 52 in series may be connected across the tachometer 40 to provide a visual indication of the speed of the dynamometer rolls.

Means may be included in the system constituting the invention for controlling the speed of rotation of the automobile wheels to any desired value. Such means may include an operational amplifier 54 having a pair of input terminals and an output terminal. A resistance 56 is in series with the resistance 44 between the terminal 30 of the bridge and one input terminal of the operational amplifier 54. A resistance 58 is connected between the other input terminal of the amplifier and the terminal 33 of the bridge. Feedback is provided from the output terminal of the amplifier through a resistance 60 to the first input terminal of the amplifier. The operational amplifier 54 has a high gain.

The output from the operational amplifier 54 is introduced through a resistance 64 to one input terminal of an operational amplifier 66 having a second input terminal connected to a reference potential such as ground. The first input terminal of the operational amplifier 66 also receives a voltage through a resistance 68 from the adjustable arm of a potentiometer 70. The potentiometer 70 is in series with a resistance 72 between a source of negative potential such as approximately −15 volts and the reference potential such as ground.

A rheostat 76 and a resistance 78 provide a feedback between the output terminal of the operational amplifier 66 and the first input terminal of the amplifier. The output of the operational amplifier 66 is connected to one terminal of a winding 80 in an electrical pressure transducer which controls the operation of an air amplifier. The air amplifier in turn controls the braking force applied to the dynamometer rolls 14. The application of a braking force to the dynamometer rolls in accordance with the operation of an air amplifier is disclosed in detail in copending application Ser. No. 856,535 filed by me on Sept. 10, 1969, for "Test Apparatus" and assigned of record to the assignee of record of this application.

The tachometer 40 provides a voltage having a magnitude substantially proportional to the speed of the dynamometer rolls 14. This voltage is introduced to the pair of opposite terminals 30 and 31 in the bridge to apply a voltage across the bridge. When no braking force is applied to the arm 18, all of the strain gages 22, 24, 26 and 28 are not under stress so that the bridge is balanced. This causes voltages of substantially equal magnitude to be produced at the pair of opposite terminals 32 and 33 in the bridge so that no voltage is introduced to the operational amplifier 34 and no indication is provided by the meter 38.

As is well known, horsepower equals torque times angular speed times a suitable constant. The torque provided in the arm 18 causes a particular stress or strain such as compression to be applied to the strain gages 22 and 24 and a stress such as tension to be applied to the strain gages 26 and 28. The magnitude of such stress or strain is proportional to the torque applied to the arm 18. The stresses or strains produced in the strain gages 22, 24, 26 and 28 provide an unbalance in the bridge and this unbalance produces between the pair of opposite terminals 32 and 33 a voltage substantially proportional to the unbalance. Since the voltage between the terminals 32 and 33 is also dependent in part upon the voltage produced by the tachometer 40, the voltage produced across the terminals 32 and 33 indicates horsepower by providing a multiplication of torque times angular speed. This unbalance in the voltages between the terminals 32 and 33 is indicated by the meter 38 which provides a direct indication of the horsepower.

Since the voltage between the terminals 32 and 33 represents the unbalance resulting from the stresses or strains in the strain gages 22, 24, 26 and 28, this voltage is relatively low. For example, the voltage between the terminals 32 and 33 may be in the order of 30 millivolts when the voltage from the tachometer varies between 0 and 12 volts as a result of variations in the speed of the dynamometer rolls 14. Since the voltage between the pair of opposite terminals 32 and 33 is relatively low, it is important to prevent common mode signals in the bridge from overwhelming the potential produced at the terminal 33. This common mode rejection is produced by connecting the terminal 32 to a reference potential such as ground so that the signals common to the terminals 30 and 31 are cancelled. In this way, the bridge responds only to the voltage produced between the terminals 30 and 31 to represent speed and the unbalance produced in the bridge as a result of the stresses and strains in the strain gages 22, 24, 26 and 28.

When the system constituting this invention is used only to measure horesepower and not to provide speed control, the strain gages 22, 44, 26 and 28 may be of the semiconductor type to provide for the production of large changes in voltages as a result of the stresses and strains imposed upon the strain gages. As a result, the horsepower can be measured directly across the terminals 32 and 33 without any need to amplify the voltages produced across these terminals. It will be appreciated, however, that strain gages of the semiconductor type may also be used in the bridge when the invention is used to provide speed control.

The operational amplifiers 54 and 66 are included in the system constituting this invention when speed control is to be provided. The operational amplifiers such as the amplifier 54 buffer the voltages introduced to the input terminals so that any changes in the output from the amplifiers will not affect the inputs to the amplifiers. Furthermore, the operational amplifiers are provided so that the voltages at the outputs of the amplifiers will be independent of any changes in the output loads and particularly will be independent of any changes resulting from changes in the positioning of the movable arm of the potentiometer 70.

The input impedance of the operational amplifier 54 is relatively low. Furthermore, since the operational amplifier has a high gain such as a gain of at least 100,000, the input voltage to the amplifier may be relatively low. This may be seen by dividing the output voltage by the gain to obtain the input voltage. Since the input impedance of the amplifier 54 is low and the input voltage to the amplifier is low, the resistances 56 and 60 are connected effectively between the tachometer 40 and the terminal 33. In order to balance the effect of these resistances on the bridge, a resistance 81 and a rheostat 82 may be connected in series between the tachometer 40 and the terminal 32 of the bridge. The combined values of the resistance 81 and the rheostat 82 may be substantially equal to the combined values of the resistances 56 and 58.

The voltage produced at the output terminal of the amplifier 54 represents the speed of the dynamometer rolls 14. This voltage is introduced as a positive voltage to one input terminal of the operational amplifier 66.

This input terminal also receives a negative voltage which is produced on the movable arm of the potentiometer 70. This negative voltage represents a desired speed of the dynamometer rolls 14. When the actual speed of the dynamometer rolls 14 corresponds to the desired speed of the dynamometer rolls, the positive voltage on the output terminal of the amplifer 54 is substantially equal to the negative voltage on the movable arm of the potentiometer 70 so that no voltage is produced in the operational amplifier 66. This causes the braking force applied to the dynamometer rolls 14 to remain substantially constant. As will be appreciated, the amplifer 66 may be biased to maintain the braking force at a value equal to the torque produced by the automobile so that the speed of the automobile will not change.

When the output of the amplifier 54 is different in magnitude from the voltage on the movable arm of the potentiometer 70, the difference indicates that the braking force on the dynamometer rolls has to be adjusted so that the speed of rotation of the automobile wheels will be able to reach the desired value. For example, when the operational amplifier provides a voltage greater in magnitude than that on the movable arm of the potentiometer 70, the braking force should be increased to decrease the speed of rotation of the automobile wheels so that this speed will be equal to the desired value. Similarly, when the output of the operational amplifier is a voltage less in magnitude than that on the movable arm of the potentiometer 70, the braking force on the dynamometer wheels should be decreased to provide an increase in the speed of rotation of the automobile wheels so that this speed will reach the desired value.

As will be appreciated, the resistance values in the bridge change with variations in the torque applied to the arm 18. If the effective resistance of the bridge can be expressed as a single resistance value, the value of this resistance will also change with variations in the torque applied to the bridge. However, the changes in the value of this effective resistance will be relatively small, as may be seen by the fact that the voltage between the terminals 32 and 33 is only in the range of tens of millivolts. Since the effective resistance of the bridge changes only slightly with variations in applied torque, such changes in the effective resistance of the bridge will not affect appreciably the balance or the operation of the amplifiers 54 and 66.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination in a dynamometer for measuring the horsepower provided by an automobile having wheels which are disposed on rolls of the dynamometer,
   first means for providing a torque to the dynamometer rolls,
   second means responsive to the speed of rotation of the wheels of the automobile engine for producing a voltage related to such speed,
   a strain gage having characteristics for providing variations in impedance in accordance with the strain imparted to the strain gage,
   an electrical bridge circuit having a plurality of electrical arms connected in an arrangement defined by first and second pairs of opposite terminals, the strain gage being connected in one of the arms of the bridge, the strain gage being operatively coupled to the first means to receive strains in accordance with the torque provided by the first means and to provide voltage variations in the bridge in accordance with such strains and in representation of electrical unbalances in the bridge,
   third means for introducing the voltage from the second means to the first pair of opposite terminals in the bridge, and
   fourth means responsive to the voltage across the second pair of opposite terminals in the bridge for indicating the horsepower provided by the automobile, a particular one of the terminals in the second pair receiving a ground potential to provide a rejection of the voltages common to the terminals in the first pair.

2. The combination set forth in claim 1 wherein;
   fifth means are connected between a particular one of the terminals in the first pair and the other one of the terminals in the second pair and are provided with a particular impedance for producing a control over the speed of rotation of the wheels of the automobile and wherein sixth means are connected between the particular one of the terminals in the first pair and the particular one of the terminals in the second pair for compensating the bridge for the effect of the impedance provided by the fifth means.

3. In combination in a dynamometer for measuring the horsepower provided by an automobile having wheels which are disposed on rolls of the dynamometer,
   an electrical bridge circuit formed from a plurality of strain gages each having an electrical member having a variable impedance in accordance with the strain imparted to the member, different pairs of strain gages being connected to each other in the bridge to provide first and second pairs of opposite terminals,
   first means for imparting a braking action to the dynamometer rolls,
   second means responsive to the braking action provided by the first means for imparting a strain to the strain gages in accordance with such braking action,
   third means responsive to the speed of rotation of the automobile wheels for producing a voltage related to such speed,
   fourth means responsive to the voltage from the third means for applying such voltage to the first pair of opposite terminals in the bridge, and
   fifth means responsive to the voltage produced across the second pair of opposite terminals in the bridge in accordance with any electrical unbalance in the bridge for indicating the horsepower provided by the automobile, one of the terminals in the second pair receiving a ground potential to provide a rejection of voltages common to the terminals in the first pair.

4. In combination in a dynamometer for measuring the horsepower provided by an automobile having wheels which are disposed on rolls of the dynamometer, an electrical bridge circuit formed from a plurality of strain gages each having an electrical member having a variable impedance in accordance with the strain imparted to the member, different pairs of strain gages being connected to each other in the bridge to provide first and second pairs of opposite terminals, first means for imparting a braking action to the dynamometer rolls, second means responsive to the braking action provided by the first means for imparting a strain to the strain gages in accordance with such braking action, third means responsive to the speed of rotation of the automobile wheels for producing a voltage related to such speed, fourth means responsive to the voltage from the third means for applying such voltage to the first pair of opposite terminals in the bridge, fifth means responsive to the voltage produced across the second pair of opposite terminals in the bridge in accordance with any electrical unbalance in the bridge for indicating the horsepower provided by the automobile, a first operational amplifier and at least a first impedance being connected in series between first terminals in the first and second pairs to provide an indication of the speed of rotation of the wheels of the automobile, and at least a second impedance being connected between the first terminal in the first pair and the other terminal in the second pair and being provided with a value to compensate for the value of the first impedance.

5. The combination set forth in claim 4 wherein the second terminal in the second pair is connected to a ground potential.

6. The combination set forth in claim 5 wherein adjustable means are provided for providing an adjustable control voltage for a desired speed of rotation of the wheels of the automobile and wherein means including a second operational amplifier are responsive to the voltage from the first operational amplifier and the adjustable control voltage for producing a voltage for providing a control over the speed of rotation of the wheels of the automobile.

7. In combination in a dynamometer for measuring the horsepower provided by an automobile having wheels which are disposed on the dynamometer, first means for producing a torque on the dynamometer rolls, an electrical bridge circuit formed from a plurality of strain gages and having a plurality of different electrical arms connected in individual pairs to provide first and second pairs of opposite terminals and having individual ones of the gages in the different arms of the bridge, a first pair of strain gages being mechanically coupled to the first means to be placed in compression in accordance with the torque produced by the first means and a second pair of strain gages being mechanically coupled to the first means to be placed in tension in accordance with the torque produced by the first means to provide an electrical unbalance of the bridge in accordance with the compression and tension imparted to the gages, second means responsive to the rotation of the dynamometer rolls for providing a voltage substantially proportional to the speed of such rotation, third means for applying the voltage from the second means to the first pair of opposite terminals in the bridge circuit, and fourth means responsive to the voltage produced across the second pair of opposite terminals in the bridge circuit for providing an indication of the horsepower provided by the automobile, a particular one of the terminals in the second pair being connected to a ground potential to provide a rejection of the voltages common to the terminals in the first pair.

8. In the combination set forth in claim 7, fifth means connected across one of the arms of the bridge for providing a voltage for obtaining a control over the speed of the dynamometer rolls, and sixth means connected across a second arm of the bridge for compensating for the effect on the bridge of the fifth means.

9. In the combination set forth in claim 8, the fifth means being connected between a particular one of the terminals in the first pair and the other terminal in the second pair and including at least one resistance and an operational amplifier, the sixth means being connected between the particular one of the terminals in the first pair and the particular terminal in the second pair and having an impedance substantially equal to the impedance of the fifth means, and seventh means for providing an adjustable voltage for comparison with the voltage from the operational amplifier to provide a control over the speed of the dynamometer rolls in accordance with such comparison.

* * * * *